United States Patent
Li et al.

(10) Patent No.: US 10,637,659 B1
(45) Date of Patent: Apr. 28, 2020

(54) PREVENTING MISREPRESENTATION OF INPUT DATA BY PARTICIPANTS IN A SECURE MULTI-PARTY COMPUTATION

(71) Applicant: Alibaba Group Holding Limited, George Town (KY)

(72) Inventors: Lichun Li, Hangzhou (CN); Wenzhen Lin, Hangzhou (CN); Zheng Liu, Hangzhou (CN); Shan Yin, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/587,142

(22) Filed: Sep. 30, 2019

Related U.S. Application Data

(63) Continuation of application No. PCT/CN2019/078516, filed on Mar. 18, 2019.

(51) Int. Cl.
*H04L 29/06* (2006.01)
*H04L 9/08* (2006.01)
(Continued)

(52) U.S. Cl.
CPC .............. *H04L 9/085* (2013.01); *H04L 9/008* (2013.01); *H04L 9/0637* (2013.01);
(Continued)

(58) Field of Classification Search
CPC ....... H04L 9/085; H04L 9/0869; H04L 9/008; H04L 9/0637
(Continued)

(56) References Cited

U.S. PATENT DOCUMENTS

| 2016/0112197 A1* | 4/2016 | Johnston | H04L 9/3093 |
| | | | 713/168 |
| 2018/0096248 A1* | 4/2018 | Chabanne | H04L 9/008 |
| 2018/0139054 A1* | 5/2018 | Chu | H04L 9/3247 |

FOREIGN PATENT DOCUMENTS

WO   WO 2017177313   10/2017

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Evans Desrosiers
(74) *Attorney, Agent, or Firm* — Fish & Richardson P.C.

(57) ABSTRACT

Disclosed herein are methods, systems, and apparatus, including computer programs encoded on computer storage media, for secure multi-party computation. One of the methods includes identifying a trusted input data item that is homomorphically encrypted; generating a message authentication code (MAC) key share; generating a MAC share associated with the trusted input data item, wherein the MAC share is a random number; generating a ciphertext based on the trusted input data item, the MAC key share, and the MAC share; sending the ciphertext to the second computing device, wherein the second computing device uses the ciphertext as a component of a MAC share associated with the secret input data item; and after the multi-party computation is completed by the plurality of computing devices, verifying a result of the multi-party computation based at least in part on the MAC share associated with the secret input data item.

27 Claims, 4 Drawing Sheets

(51) Int. Cl.
H04L 9/00 (2006.01)
H04L 9/06 (2006.01)
H04L 9/32 (2006.01)

(52) U.S. Cl.
CPC .......... *H04L 9/0869* (2013.01); *H04L 9/3242* (2013.01); *H04L 2209/38* (2013.01)

(58) Field of Classification Search
USPC .......................................................... 713/171
See application file for complete search history.

(56) References Cited

OTHER PUBLICATIONS

Nakamoto, "Bitcoin: A Peer-to-Peer Electronic Cash System," www.bitcoin.org, 2005, 9 pages.

PCT Written Opinion of the International Searching Authority in International Application No. PCTCN2019078516, dated Dec. 12, 2019, 3 pages.

\* cited by examiner

US 10,637,659 B1

PREVENTING MISREPRESENTATION OF INPUT DATA BY PARTICIPANTS IN A SECURE MULTI-PARTY COMPUTATION

CROSS-REFERENCE TO RELATED APPLICATIONS

This application is a continuation of PCT Application No. PCT/CN2019/078516, filed on Mar. 18, 2019, which is hereby incorporated by reference in its entirety.

TECHNICAL FIELD

This specification relates to secure multi-party computation.

BACKGROUND

Secure multi-party computation involves multiple participant computing devices cooperating to perform a computation based on input from each participant that is to be kept secret from the other participants. Existing techniques provide mechanisms for a participant to verify that a final result of the computation is correct without knowing the secret input data of the other participants.

Distributed ledger systems (DLSs), which can also be referred to as consensus networks, and/or blockchain networks, enable participating entities to securely, and immutably store data. DLSs are commonly referred to as blockchain networks without referencing any particular user case. Examples of types of blockchain networks can include public blockchain networks, private blockchain networks, and consortium blockchain networks. A consortium blockchain network is provided for a select group of entities, which control the consensus process, and includes an access control layer.

Existing secure multi-party computation techniques do not provide any assurance that each participant in the computation is correctly representing their secret input data. A party could therefore influence the final result of the computation, possibly in their favor, by manipulating their own secret input data. Techniques to allow other participants to a multi-party computation to verify that all secret input data is being accurately represented by other participants would be desirable.

SUMMARY

This specification describes technologies for preventing misrepresentation of input data by participants in a multi-party computation. These technologies generally involve a party obtaining a trusted input data item that is a homomorphically encrypted version of the secret input data of another party. The party then generates a trusted message authentication code (MAC) share of the trusted input data item, and generates a ciphertext based at least in part on the trusted MAC share. The party then provides the ciphertext to the party associated with the secret input data, who calculates the MAC share of its secret input data with the ciphertext received from the other party as a component.

This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
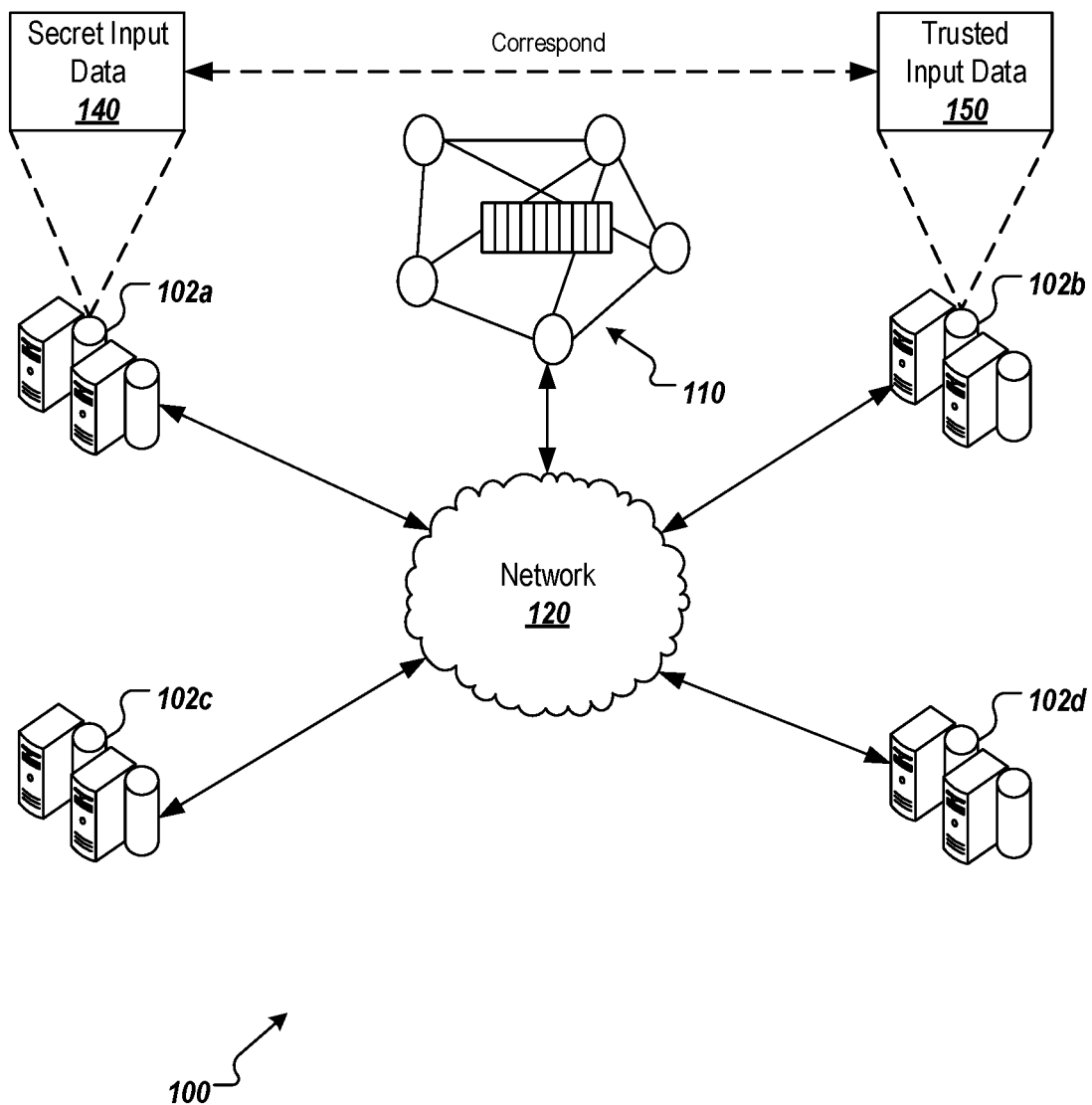
FIG. 1 is a diagram illustrating an example of an environment that can be used to execute embodiments of this specification.

To provide further context for embodiments of this specification, and as introduced above, secure multi-party computation involves multiple participant computing devices cooperating to perform a computation based on input from each participant that is to be kept secret from the other participants. One technique for performing a secure multi-party computation is the Smart-Pastro-Damgård-Zakarias (SPDZ) protocol (the original SPDZ protocol or a variant thereof). In SPDZ, the parties agree on a MAC key that is secret-shared between the parties so no one party knows the MAC key. The parties use shares of the MAC key to generate a MAC of their secret input data, which can be used to verify that the shares of the secret input data have not been tampered with by other parties during the computation. Each party then secret-shares both the MAC (as "MAC shares") and the secret input data with the other parties such that each party receives a share. Each party then performs the computation locally on all the input and MAC shares it has received to produce a result share z and a result MAC share M(z). For an addition computation with n parties, the final result r is determined according to the equation:

$$r = z_1 + z_2 + \ldots z_n$$

and the MAC result M(r) of the multi-party computation is determined according to the equation:

$$M(r) = M(z_1) + M(z_2) + \ldots M(z_n)$$

If a malicious party attempts to tamper with the computation by providing a false result z, it will not be able to alter the corresponding MAC value to make it match the false result. Thus, the final MAC result M(r) will not match the result r, and the other parties will be alerted to the tampering.

In the above approach, a malicious party can still tamper with the computation by misrepresenting the value of its secret input data. Such a misrepresentation would be not be detectable using the scheme above.

This specification describes techniques for preventing misrepresentation of input data by participants in a multi-party computation. These technologies generally involve a party obtaining a homomorphically encrypted version of the secret input data of another party from a trusted source such as a blockchain. The party then generates a message authentication code (MAC) of the encrypted data, and provides the MAC to the party associated with the secret input data, who calculates the MAC of its secret input data with the MAC received from the other party as a component. This can ensure that each party is correctly representing its secret input data by tying the MAC of the secret input data to the corresponding ciphertext obtained from a trusted source, such as a blockchain, a trusted party that has cryptographically-signed the trusted input data, or other sources.

A blockchain is a data structure that stores transactions in a way that the transactions are immutable. Thus, transactions recorded on a blockchain are reliable and trustworthy. A blockchain is a decentralized or at least partially decentralized data structure for storing transactions. A blockchain network is a network of computing nodes that manage, update, and maintain one or more blockchains by broadcasting, verifying and validating transactions, etc. In some examples, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus. The techniques described herein leverage the consensus mechanisms of the blockchain to provide an assurance that trusted input data retrieved from the blockchain has not changed since it was entered in the blockchain.

FIG. 1 is a diagram illustrating an example of an environment 100 that can be used to execute embodiments of this specification. In some examples, the environment 100 enables entities to participate in a multi-party computation. The environment 100 includes nodes 102a-d, and a network 130. In some examples, the network 130 includes a local area network (LAN), wide area network (WAN), the Internet, or a combination thereof, and connects web sites, user devices (e.g., computing devices), and back-end systems. In some examples, the network 130 can be accessed over a wired and/or a wireless communications link. In some examples, the network 130 enables communication with, and within the environment 100. In general the network 130 represents one or more communication networks. In some cases, the nodes 102a-d can be nodes of a cloud computing system (not shown), or each node 102a-d can be a separate cloud computing system including a number of computers interconnected by a network and functioning as a distributed processing system.

In the depicted example, the nodes 102a-d can each include any appropriate computing system that enables participation in a multi-party computation. Examples of computing devices include, without limitation, a server, a desktop computer, a laptop computer, a tablet computing device, and a smartphone. In some examples, the nodes 102a-d host one or more computer-implemented services for interacting with the other nodes participating in the multi-party computation. In some implementations, the node 102a can be associated with a first entity, and can store data associated with the first entity. The node 102b can host computer-implemented services of a second entity, and can store data associated with the second entity. In the example of FIG. 1, the environment 100 is represented as a peer-to-peer network of nodes 102a-d participating in the multi-party computation.

Node 102a stores secret input data 140 to be provided by the node 102a as input to the multi-party computation. In some examples, the secret input data 140 is sensitive data that should not have its value revealed to the other nodes 102b-d participating in the multi-party computation. In some cases, each of the nodes 102a-d stores its own secret input data. As described above, using algorithms such as SPDZ the nodes 102a-d can perform a multi-party computation on the secret input data from each node, and produce a correct and verifiable result of the computation without any node revealing the true value of its secret input data to any other node.

Node 102b stores trusted input data 150 that corresponds to secret input data 140 stored by node 102a. In some cases, trusted input data 150 can be an encrypted representation of the secret input data 140 for which only node 102a holds the decryption key, meaning that node 102b cannot learn the true value of the secret input data 140 from the trusted input data 150. In some cases, the trusted input data 150 is obtained by node 102b from a trusted data source 110, shown here as a blockchain. In some examples, the trusted input data 150 is obtained from a source that ensures its authenticity. For example, a properly-maintained blockchain ensures that data that is stored in the blockchain is immutable once stored, meaning that there is little risk that node 102a or any other actor changed the value of the trusted input data 150 after it was stored in the blockchain. The trusted input data 150 can also be obtained from a trusted third party that cryptographically signs the trusted input data 150 to allow its authenticity to be verified. In some cases, the trusted input data 150 can be an encrypted hash of the secret input data 140, and node 102b can obtain a zero-knowledge proof algorithm from node 102a to verify that the encrypted hash corresponds to a hash value of the secret input data 140.

Figure 2:
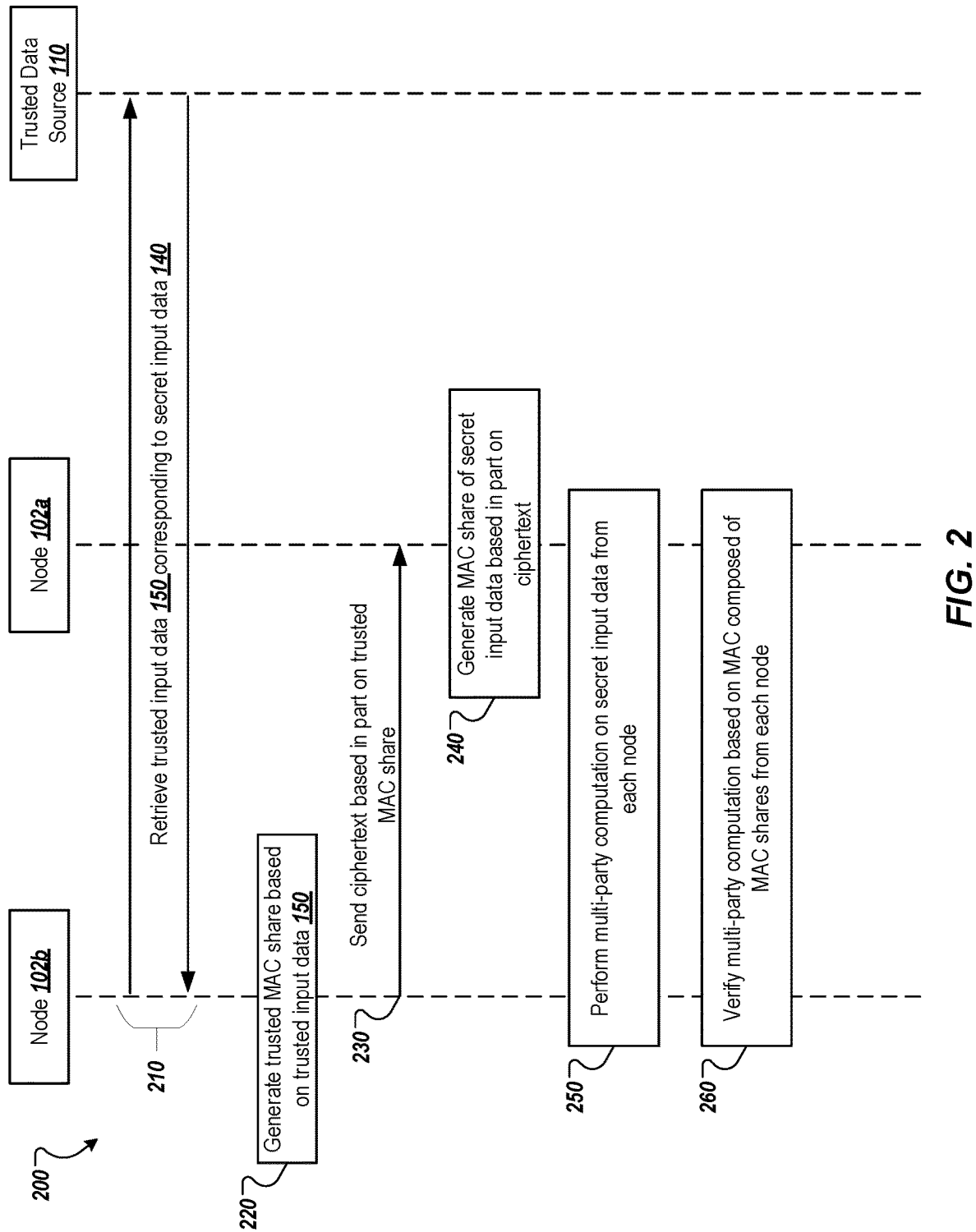
FIG. 2 depicts an example of a signal flow in accordance with implementations of the present disclosure.

FIG. 2 depicts an example of a signal flow 200 in accordance with implementations of the present disclosure. At 210, the node 102b retrieves the trusted input data 150 corresponding to the secret input data 140 stored by node 102a from the trusted data source 110. At 220, the node 102b generates a trusted MAC share based on the trusted input data 150. In some cases, the trusted MAC share can be based on a MAC key share generated by the node 102b, which is a share of a global MAC key generated by all nodes participating in the multi-party computation.

At 230, node 102b sends a ciphertext based in part on the trusted MAC share to the node 102a. In some cases, the node 102b generates the ciphertext based on the trusted input data, the MAC key share, and the trusted MAC share. At 240, the node 102a generates a MAC share of the secret input data based in part on the ciphertext. In some cases, the MAC share is generated based on the ciphertext, a MAC key share associated with the node 102a, the secret input data item, and a secret key configured to decrypt the trusted input data item.

At 250, the nodes 102a-b perform the multi-party computation. In some cases, the nodes 102a-b perform the computation in cooperation with other nodes that are participating in the computation. In some examples, the multi-party computation is performed according to the SPDZ protocol, discussed above.

At 260, the nodes 102a-b perform the multi-party computation. In some cases, the nodes 102a-b verify the computation in cooperation with other nodes that are participating in the computation. In some examples, the multi-party computation is verified according to the SPDZ protocol, discussed above.

Figure 3:
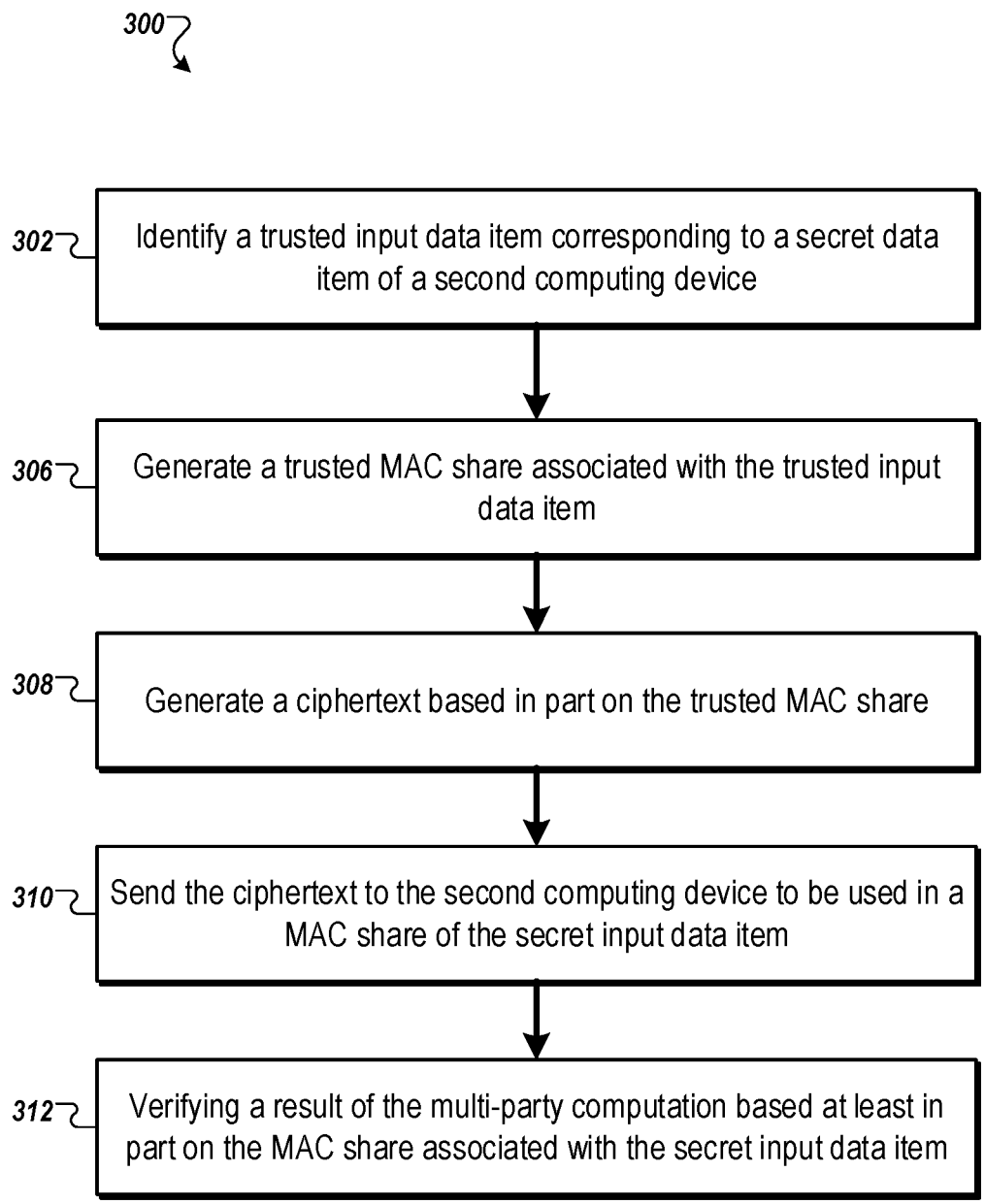
FIG. 3 depicts an example of a process that can be executed in accordance with embodiments of this specification.

FIG. 3 is a flowchart of an example of a process 300 for preventing misrepresentation of input data in a multi-party computation involving a plurality of computing devices. For convenience, the process 300 will be described as being performed by a system of one or more computers, located in one or more locations, and programmed appropriately in accordance with this specification. For example, a system, e.g., the system 100 of FIG. 1, appropriately programmed, can perform the process 300.

At 302, a first computing device identifies a trusted input data item that is homomorphically encrypted, wherein the trust input data item corresponds to a secret input data item associated with a second computing device different than the first computing device, wherein the second computing device is associated with an owner of the secret input data item, and wherein the first computing device is associated with a different party that is not the owner of the secret input data item. In some cases, the trusted input data item is received by the first computing device from a trusted data source. In some examples, the trusted data source is a blockchain.

At 304, the first computing device generates a trusted MAC share associated with the trusted input data item.

At 306, the first computing device generates a ciphertext based at least in part on the trusted MAC share.

At 308, the first computing device sends the ciphertext to the second computing device, wherein the second computing device uses the ciphertext as a component of a MAC share associated with the secret input data item. In some cases, the MAC share associated with the secret input data item is generated based on the ciphertext, a MAC key share associated with the second computing device, the secret input data item, and a secret key configured to decrypt the trusted input data item.

At 310, after the multi-party computation is completed by the plurality of computing devices, the first computing device verifies a result of the multi-party computation based at least in part on the MAC share associated with the secret input data item.

In some cases, the process 300 includes generating, by the first computing device, a MAC key share associated with the first computing device, wherein the MAC key share is a random number and wherein the ciphertext is generated based at least in part on the MAC key share.

In some cases, the process 300 includes performing the multi-party computation according to the Smart-Pastro-Damgår-Zakarias (SPDZ) protocol before verifying the multi-party computation, and verifying the result of the multi-party computation is performed according to the SPDZ protocol.

In some examples, the result r of the multi-party computation is determined according to the equation:

$$r=f(z_1,z_2,\ldots z_n)$$

where $f$ is the operation performed by the multi-party computation, and $z_1, z_2, \ldots z_n$ are the secret input data items associated with the plurality of computing devices; and the MAC result M(r) of the multi-party computation is determined according to the equation:

$$M(r)=M(f(z_1,z_2,\ldots z_n))$$

where M is a MAC function used to generate the MAC share of the secret input data item. In some cases, the MAC function is a numerical operation that generates a number to be used as a MAC share given a data item and a MAC key share as input. In some implementations, the MAC function will produce the same number when given the same input, similar to a hash function.

In some cases, the operation performed by the multi-party computation is an addition operation, and the result r of the multi-party computation is determined according to the equation:

$$r=z_1+z_2+\ldots z_n$$

and the MAC result M(r) of the multi-party computation is determined according to the equation:

$$M(r)=M(z_1)+M(z_2)+\ldots M(z_n)$$

Figure 4:
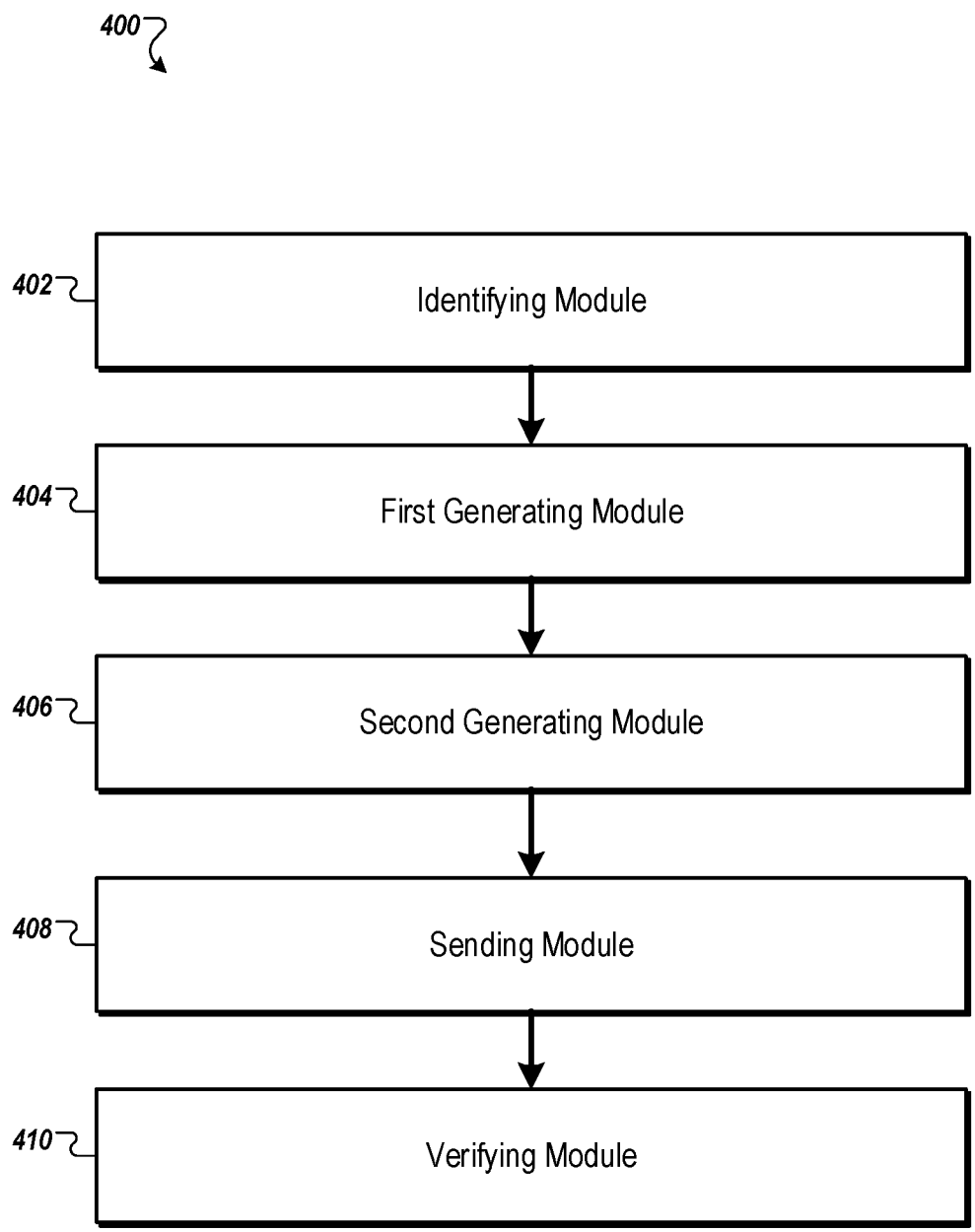
FIG. 4 depicts examples of modules of an apparatus in accordance with embodiments of this specification.

FIG. 4 is a diagram of on example of modules of an apparatus 400 in accordance with embodiments of this specification.

The apparatus 400 can be an example of an embodiment of a computing device capable of performing a multi-party computation. The apparatus 400 can correspond to the embodiments described above, and the apparatus 400 includes the following: an identifying module 402 that identifies a trusted input data item that is homomorphically encrypted, wherein the trust input data item corresponds to a secret input data item associated with a second computing device different than the first computing device, wherein the second computing device is associated with an owner of the secret input data item, and wherein the first computing device is associated with a different party that is not the owner of the trust input data item; a first generating module 404 that generates a trusted MAC share associated with the trusted input data item; a second generating module 406 generates a ciphertext based at least in part on the trusted MAC share; a sending module 408 that sends the ciphertext to the second computing device, wherein the second computing device uses the ciphertext as a component of a MAC share associated with the secret input data item; a verifying module 310 that verifies a result of the multi-party computation based at least in part on the ciphertext based on the trusted input data item being a component of the MAC share associated with the secret input data item after the multi-party computation is completed by the plurality of computing devices.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIG. 4, it can be interpreted as illustrating an internal functional module and a structure of computing device operable to participate in a multi-party computation. An execution body in essence can be an electronic device, and the electronic device includes the following: one or more processors; and a memory configured to store an executable instruction of the one or more processors.

The techniques described in this specification produce one or more technical effects. In some embodiments, the techniques described herein provide enhanced data security for participants of a multi-party computation by allowing computing devices participating in the multi-party computation to verify that all other participants are providing authentic input data to the computation. This prevents a malicious participant from misrepresenting their input data to influence the result of the multi-party computation. The techniques allow this verification to be performed as part of the multi-party computation such that there is not a large amount of time between the production of the result and the verification.

Described embodiments of the subject matter can include one or more features, alone or in combination.

For example, in a first embodiment, an example method comprises identifying, by a first computing device, a trusted input data item that is homomorphically encrypted, wherein the trust input data item corresponds to a secret input data item associated with a second computing device different than the first computing device, wherein the second computing device is associated with an owner of the secret input data item, and wherein the first computing device is associated with a different party that is not the owner of the trust input data item; generating, by the first computing device, a trusted MAC share associated with the trusted input data item; generating, by the first computing device, a ciphertext based at least in part on the trusted MAC share; sending, by the first computing device, the ciphertext to the second computing device, wherein the second computing device uses the ciphertext as a component of a MAC share associated with the secret input data item; and after the multi-party computation is completed by the plurality of computing devices, verifying, by the first computing device, a result of the multi-party computation based at least in part on the MAC share associated with the secret input data item.

The foregoing and other described embodiments can each, optionally, include one or more of the following features:

A first feature, combinable with any of the following features, specifies that the trusted input data item is received by the first computing device from a trusted data source.

A second feature, combinable with any of the previous or following features, specifies that the trusted data source is a blockchain.

A third feature, combinable with any of the previous or following features, specifies that the method further comprises generating, by the first computing device, a MAC key share associated with the first computing device, wherein the MAC key share is a random number and wherein the ciphertext is generated based at least in part on the MAC key share.

A fourth feature, combinable with any of the previous or following features, specifies that the MAC share associated with the secret input data item is generated based on the ciphertext, a MAC key share associated with the second computing device, the secret input data item, and a secret key configured to decrypt the trusted input data item.

A fifth feature, combinable with any of the previous or following features, specifies that the method further comprises before verifying the multi-party computation, performing the multi-party computation according to the Smart-Pastro-Damgård-Zakarias (SPDZ) protocol, and wherein verifying the result of the multi-party computation is performed according to the SPDZ protocol.

A sixth feature, combinable with any of the previous or following features, specifies that the result r of the multi-party computation is determined according to the equation:

$$r=f(z_1,z_2,\ldots z_n)$$

where $f$ is the operation performed by the multi-party computation, and $z_1, z_2, \ldots z_n$ are the secret input data items associated with the plurality of computing devices; and wherein the MAC result M(r) of the multi-party computation is determined according to the equation:

$$M(r)=M(f(z_1,z_2,\ldots z_n))$$

where M is a MAC function used to generate the MAC share of the secret input data item.

A seventh feature, combinable with any of the previous or following features, specifies that the operation performed by the multi-party computation is an addition operation, wherein the result r of the multi-party computation is determined according to the equation:

$$r=z_1+z_2+\ldots z_n$$

and wherein the MAC result M(r) of the multi-party computation is determined according to the equation:

$$M(r)=M(z_1)+M(z_2)+\ldots M(z_n)$$

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiment can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for preventing misrepresentation of input data in a multi-party computation involving a plurality of computing devices, the method comprising:
    identifying, by a first computing device from the plurality of computing devices, a trusted input data item that is homomorphically encrypted, wherein the trusted input data item corresponds to a secret input data item associated with a second computing device from the plurality of computing devices that is different than the first computing device, wherein the second computing device is associated with an owner of the secret input data item, and wherein the first computing device is associated with a different party that is not the owner of the secret input data item;
    generating, by the first computing device, a trusted message authentication code (MAC) share associated with the trusted input data item;
    generating, by the first computing device, a ciphertext based at least in part on the trusted MAC share;
    sending, by the first computing device, the ciphertext to the second computing device, wherein the second computing device uses the ciphertext as a component of a MAC share associated with the secret input data item; and
    after the multi-party computation is completed by the plurality of computing devices, verifying, by the first computing device, a result r of the multi-party computation based at least in part on the MAC share associated with the secret input data item, wherein the result r of the multi-party computation is determined according to the equation:

$$r=f(z_1,z_2,\ldots z_n)$$

where $f$ is an operation performed by the multi-party computation, and $z_1, z_2, \ldots z_n$ are the secret input data items associated with the plurality of computing devices; and
    wherein a MAC result $M(r)$ of the multi-party computation is determined according to the equation:

$$M(r)=M(f(z_1,z_2,\ldots z_n))$$

where M is a MAC function used to generate the MAC share of the secret input data item.

2. The method of claim 1, wherein the trusted input data item is received by the first computing device from a trusted data source.

3. The method of claim 2, wherein the trusted data source is a blockchain.

4. The method of claim 1, further comprising:
    generating, by the first computing device, a MAC key share associated with the first computing device, wherein the MAC key share is a random number and wherein the ciphertext is generated based at least in part on the MAC key share, the trusted input data item and the trusted MAC share.

5. The method of claim 1, wherein the MAC share associated with the secret input data item is generated based on the ciphertext, a MAC key share associated with the second computing device, the secret input data item, and a secret key configured to decrypt the secret input data item.

6. The method of claim 1, further comprising, before verifying the multi-party computation, performing the multi-party computation according to a Smart-Pastro-Damgård-Zakarias (SPDZ) protocol, and wherein verifying the result of the multi-party computation is performed according to the SPDZ protocol.

7. The method of claim 1, wherein the operation performed by the multi-party computation is an addition operation, wherein the result r of the multi-party computation is determined according to the equation:

$$r=z_1+z_2+\ldots z_n$$

and wherein a MAC result $M(r)$ of the multi-party computation is determined according to the equation:

$$M(r)=M(z_1)+M(z_2)+\ldots M(z_n).$$

8. The method of claim 7, wherein shares of the MAC result $M(r)$ are computed based on MAC shares of input data by the plurality of computing devices.

9. The method of claim 1, wherein the trusted MAC share is a random number.

10. A non-transitory, computer-readable storage medium storing one or more instructions executable by a computer system to perform operations comprising:
    identifying, by a first computing device from the plurality of computing devices, a trusted input data item that is homomorphically encrypted, wherein the trusted input data item corresponds to a secret input data item associated with a second computing device from the plurality of computing devices that is different than the first computing device, wherein the second computing device is associated with an owner of the secret input data item, and wherein the first computing device is associated with a different party that is not the owner of the secret input data item;
    generating, by the first computing device, a trusted message authentication code (MAC) share associated with the trusted input data item;
    generating, by the first computing device, a ciphertext based at least in part on the trusted MAC share;
    sending, by the first computing device, the ciphertext to the second computing device, wherein the second computing device uses the ciphertext as a component of a MAC share associated with the secret input data item; and
    after the multi-party computation is completed by the plurality of computing devices, verifying, by the first computing device, a result r of the multi-party computation based at least in part on the MAC share associated with the secret input data item, wherein the result r of the multi-party computation is determined according to the equation:

$$r = f(z_1, z_2, \ldots z_n)$$

where $f$ is an operation performed by the multi-party computation, and $z_1, z_2, \ldots z_n$ are the secret input data items associated with the plurality of computing devices; and wherein a MAC result M(r) of the multi-party computation is determined according to the equation:

$$M(r) = M(f(z_1, z_2, \ldots z_n))$$

where M is a MAC function used to generate the MAC share of the secret input data item.

11. The non-transitory, computer-readable storage medium of claim 10, wherein the trusted input data item is received by the first computing device from a trusted data source.

12. The non-transitory, computer-readable storage medium of claim 11, wherein the trusted data source is a blockchain.

13. The non-transitory, computer-readable storage medium of claim 10, the operations further comprising:
generating a MAC key share associated with the first computing device, wherein the MAC key share is a random number and wherein the ciphertext is generated based at least in part on the MAC key share, the trusted input data item and the trusted MAC share.

14. The non-transitory, computer-readable storage medium of claim 10, wherein the MAC share associated with the secret input data item is generated based on the ciphertext, a MAC key share associated with the second computing device, the secret input data item, and a secret key configured to decrypt the secret input data item.

15. The non-transitory, computer-readable storage medium of claim 10, the operations further comprising:
before verifying the multi-party computation, performing the multi-party computation according to a Smart-Pastro-Damgård-Zakarias (SPDZ) protocol, and wherein verifying the result of the multi-party computation is performed according to the SPDZ protocol.

16. The non-transitory, computer-readable storage medium of claim 10, wherein the operation performed by the multi-party computation is an addition operation, wherein the result r of the multi-party computation is determined according to the equation:

$$r = z_1 + z_2 + \ldots z_n$$

and wherein a MAC result M(r) of the multi-party computation is determined according to the equation:

$$M(r) = M(z_1) + M(z_2) + \ldots M(z_n).$$

17. The non-transitory, computer-readable storage medium of claim 16, wherein shares of the MAC result M(r) are computed based on MAC shares of input data by the plurality of computing devices.

18. The non-transitory, computer-readable storage medium of claim 10, wherein the trusted MAC share is a random number.

19. A computer-implemented system, comprising:
one or more computing devices; and
one or more computer memory devices interoperably coupled with the one or more computing devices and having tangible, non-transitory, machine-readable media storing one or more instructions that, when executed by the one or more computing devices, perform one or more operations comprising:
identifying, by a first computing device from the plurality of computing devices, a trusted input data item that is homomorphically encrypted, wherein the trusted input data item corresponds to a secret input data item associated with a second computing device from the plurality of computing devices that is different than the first computing device, wherein the second computing device is associated with an owner of the secret input data item, and wherein the first computing device is associated with a different party that is not the owner of the secret input data item;
generating, by the first computing device, a trusted message authentication code (MAC) share associated with the trusted input data item;
generating, by the first computing device, a ciphertext based at least in part on the trusted MAC share;
sending, by the first computing device, the ciphertext to the second computing device, wherein the second computing device uses the ciphertext as a component of a MAC share associated with the secret input data item; and
after the multi-party computation is completed by the plurality of computing devices, verifying, by the first computing device, a result r of the multi-party computation based at least in part on the MAC share associated with the secret input data item, wherein the result r of the multi-party computation is determined according to the equation:

$$r = f(z_1, z_2, \ldots z_n)$$

where $f$ is an operation performed by the multi-party computation, and $z_1, z_2, \ldots z_n$ are the secret input data items associated with the plurality of computing devices; and wherein a MAC result M(r) of the multi-party computation is determined according to the equation:

$$M(r) = M(f(z_1, z_2, \ldots z_n))$$

where M is a MAC function used to generate the MAC share of the secret input data item.

20. The computer-implemented system of claim 19, wherein the trusted input data item is received by the first computing device from a trusted data source.

21. The computer-implemented system of claim 20, wherein the trusted data source is a blockchain.

22. The computer-implemented system of claim 19, the operations further comprising:
generating, by the first computing device, a MAC key share associated with the first computing device, wherein the MAC key share is a random number and wherein the ciphertext is generated based at least in part on the MAC key share, the trusted input data item and the trusted MAC share.

23. The computer-implemented system of claim 19, wherein the MAC share associated with the secret input data item is generated based on the ciphertext, a MAC key share associated with the second computing device, the secret input data item, and a secret key configured to decrypt the secret input data item.

24. The computer-implemented system of claim 19, the operations further comprising:
before verifying the multi-party computation, performing the multi-party computation according to a Smart- Pastro-Damgård-Zakarias (SPDZ) protocol, and wherein verifying the result of the multi-party computation is performed according to the SPDZ protocol.

25. The computer-implemented system of claim 19, wherein the operation performed by the multi-party computation is an addition operation, wherein the result r of the multi-party computation is determined according to the equation:

$$r = z_1 + z_2 + \ldots z_n$$

and wherein a MAC result M(r) of the multi-party computation is determined according to the equation:

$$M(r) = M(z_1) + M(z_2) + \ldots M(z_n).$$

26. The computer-implemented system of claim 25, wherein shares of the MAC result M(r) are computed based on MAC shares of input data by the plurality of computing devices.

27. The computer-implemented system of claim 19, wherein the trusted MAC share is a random number.

\* \* \* \* \*

UNITED STATES PATENT AND TRADEMARK OFFICE
CERTIFICATE OF CORRECTION

PATENT NO. : 10,637,659 B1  
APPLICATION NO. : 16/587142  
DATED : April 28, 2020  
INVENTOR(S) : Li et al.

Page 1 of 1

It is certified that error appears in the above-identified patent and that said Letters Patent is hereby corrected as shown below:

In the Claims

In Column 12, Line 45, in Claim 10, after "from" delete "the" and insert -- a --, therefor.

In Column 12, Line 66, in Claim 10, after "after" delete "the".

In Column 14, Line 4, in Claim 19, after "from" delete "the" and insert -- a --, therefor.

In Column 14, Line 26, in Claim 19, after "after" delete "the".

Signed and Sealed this  
Sixth Day of October, 2020

Andrei Iancu  
*Director of the United States Patent and Trademark Office*